United States Patent [19]

Goldfarb et al.

[11] 4,324,352

[45] Apr. 13, 1982

[54] TAMPER-PROOF HANGER

[76] Inventors: Charles Goldfarb, 8 rue du Commandant Rivière, Paris 8ème; Claude Iglitzki, 32 rue Manin à, Paris 19ème, both of France

[21] Appl. No.: 127,505

[22] Filed: Mar. 5, 1980

[30] Foreign Application Priority Data

Mar. 29, 1979 [FR] France ................................ 79 07901

[51] Int. Cl.[3] ................................................ A47J 51/14

[52] U.S. Cl. ......................................... 223/91; 223/93; 223/96

[58] Field of Search ............................ 223/91, 93, 96; 211/113; D6/252, 256

[56] References Cited

U.S. PATENT DOCUMENTS

| | | | |
|---|---|---|---|
| 759,772 | 5/1904 | Terletzky | 223/93 |
| 1,598,929 | 9/1926 | Parmeter | 223/93 |
| 1,713,621 | 5/1929 | Price | 223/92 |
| 2,441,407 | 5/1948 | Glavies | 223/91 |
| 3,964,651 | 6/1976 | Hamilton | 223/91 |

FOREIGN PATENT DOCUMENTS

| | | | |
|---|---|---|---|
| 286525 | 3/1928 | United Kingdom | 223/93 |

*Primary Examiner*—Robert Mackey

*Attorney, Agent, or Firm*—McAulay, Fields, Fisher, Goldstein & Nissen

[57] ABSTRACT

The invention relates to a tamper-proof hanger comprising at least one arm forming gripping jaw movably mounted in the plane of the hanger and whose mobile end may be applied against a part of the top edge of the bar supporting a garment, thus gripping a garment hanging on the hanger between the arm and the bar, and means for locking the mobile arm in closed position. This hanger is intended to prevent the theft of the garments, particularly in stores or cloakrooms.

5 Claims, 2 Drawing Figures

TAMPER-PROOF HANGER

BACKGROUND OF THE INVENTION

The present invention relates to a tamper-proof dress- or coat-hanger.

Hangers made of wood, metal or plastic material are currently used, which comprise a bow-shaped bar with each side downwardly inclined, a suspension hook being fixed at the top center thereof. These hangers can also have a lower horizontal bar extending between the two lower ends of the bow-shaped top bar. The top bar serves to hang jackets, coats, dresses, etc . . . , while the lower horizontal bar is used for other articles such as trousers.

These hangers are normally suspended, by their hooks, from horizontal clothes rails and they can therefore very easily be stolen together with the clothes that they carry.

SUMMARY OF THE INVENTION

It is an object of the present invention to remedy this drawback by providing a hanger of particularly simple design and provided with a tamper-proof device.

To this end, this tamper-proof hanger, comprising at least one top bar or inverted V-shaped yoke adapted to support a garment, the two side arms of which bar are inclined downwardly and which is provided, in its central part, with a vertically extending hook whose upper, curved portion is adapted to be hooked on a support, is characterised in that it comprises at least one arm forming a gripping jaw, mounted to move in the plane of the hanger and of which the mobile end may be applied against a part of the top edge of the bar supporting the garment, which jaw, in closed position, grips a garment suspended from the hanger between the arm and the bar, and it further comprises means for locking the mobile arm in closed position.

The locking means are advantageously constituted by a mechanism housed in the central part of the hanger which may be actuated by means of a key used only by an authorized person. According to a further feature of the invention, the hanger comprises a mobile member for completely closing the hook around the clothes rail, this mobile member being actuated by the locking mechanism so as to be able to release the hanger from its support by means of the key controlling the locking mechanism. The hanger according to the invention offers the advantage of being permanently attached to its support and of being separable therefrom only after an authorized person has intervened. In the same way, the various garments suspended from the hanger can only be removed therefrom after intervention by an authorized person. Any risk of theft is therefore avoided.

BRIEF DESCRIPTION OF DRAWINGS

The invention will be more readily understood on reading the following description with reference to the accompanying drawings, in which.

DESCRIPTION OF THE PREFERRED EMBODIMENTS

Figure 1:
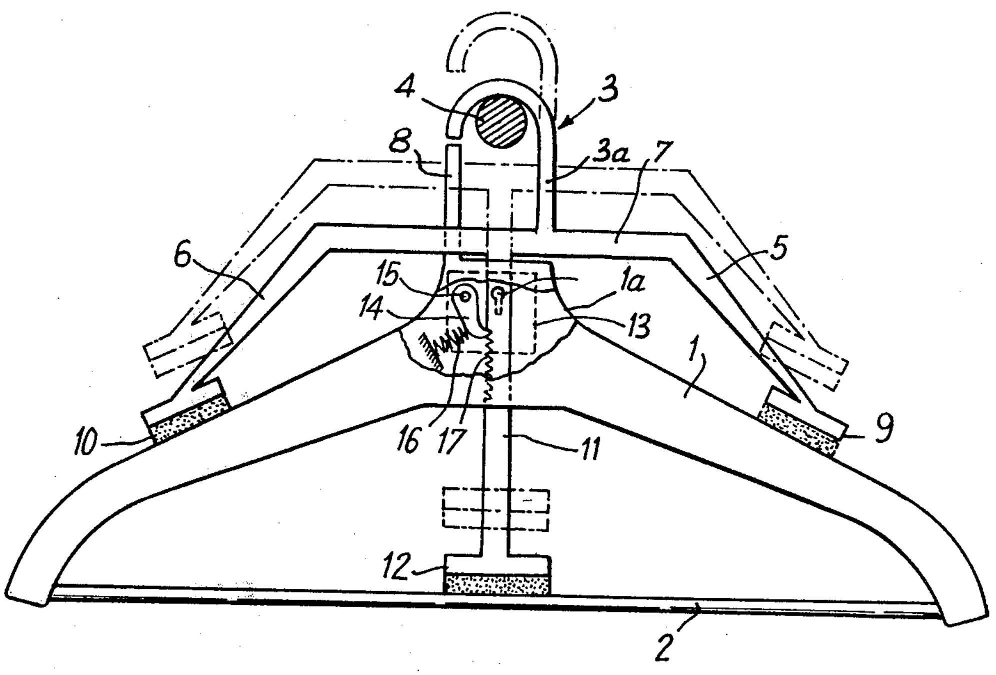
FIG. 1 is a schematic view in elevation of a tamper-proof hanger according to the invention.

Referring now to the drawings, the tamper-proof hanger shown in FIG. 1 comprises a bow-shaped top bar 1 between the lower ends of which a rectilinear horizontal bar 2 extends. Garments such as jackets, coats, etc. are hung from the top bar 1, while the lower horizontal bar 2 serves for trousers or like garments. The top bar 1 is integral, in known manner, in its central part 1*a* which constitutes its apex, with a hook 3 adapted to be hung on a clothes support 4.

The tamper-proof hanger shown in FIG. 1 comprise two arms 5,6 forming gripping jaws, which extend laterally above the top bar 1. These two arms 5, 6 are mounted to move vertically in the plane of the hanger and they may thus slide between a closed position, shown in solid lines in FIG. 1, and an open position shown partially in dashed and dotted lines. These two arms 5 and 6 are connected by a horizontal cross piece 7 from which a part 3*a* forming claw, which is one of the constituent elements of the hook 3, extends upwardly. The top part of this claw member 3*a* is curved and, in closed position, its curved end part is in line with a fixed vertical lug 8 extending from the top edge of the central part 1*a*. In closed position, the claw shaped part 3*a* and the vertical lug 8 completely surround the clothes support 4 and thus prevent the hanger from being removed therefrom.

The arms 5, 6 forming gripping jaws are curved or inclined in the direction of the two arms of the top bar 1 of the hanger and they preferably terminate, at their lower ends, in support pads 9, 10 which may, for example, be made of plastic foam. In closed position, these pads are applied under pressure against the top edges of the two arms of the bow-shaped bar 1, thus preventing a garment such as a jacket, coat, from being removed from the hanger.

The hanger shown in FIG. 1 also comprises means for locking trousers on the horizontal bar 2. These means comprise a vertical rod 11 which is integral with the horizontal cross piece 7 and which extends downwardly therefrom. This vertical rod 11 passes through a vertical housing made in the upper central part 1*a* of the bar 1 and terminates, at its lower end, in a pad 12 abutting against the horizontal rectilinear bar 2. In closed position, a pair of trousers placed on this bar 2 is gripped and immobilised between the pad 12 and the bar 2.

The tamper-proof hanger shown in FIG. 1 thus comprises a vertically movable unit, this monobloc unit comprising the two side arms 5, 6 forming the gripping jaws, the vertical rod 11 forming trouser grip and the claw-shaped part 3*a* of the hook 3. This unit is maintained in closed position by a suitable locking mechanism 13 housed in the central part 1*a* of the bar 1. This locking mechanism 13 may comprise for example a pawl 14 pivoted about a pin 15 and urged by a spring 16 in the direction of a rack 17 made in one edge of the vertical rod 11. Thus the unit composed of the mobile elements 5, 6, 11 and 3*a* is maintained firmly in closed position by the pawl 15 urged by the spring 16. The locking mechanism 13 may be actuated by means of a lock actuated by a key introduced into a hole. This key enables the pawl 14 to be rotated clockwise in FIG. 1 so as to disengage it from the rack 17 and so as thus to raise the claw-shaped part 3*a*, thus opening the hook 3, and likewise to raise the side arms 5, 6 and the rod 11, thus releasing the garments carried by the hanger.

The teeth of the rack 17 are advantageously shaped so that it suffices to push the vertically movable unit downwards to ensure an automatic locking in closed position.

From the foregoing, it is evidently impossible either to remove the hanger from the clothes support 4 on which it hangs or to remove the garments hanging on this hanger, without having actuated the locking mechanism 13 beforehand.

Although, in the example described hereinabove, the hanger comprises two side arms 5, 6, it goes without saying that it may well comprise only one. Furthermore, the movable part 3*a* forming part of the hook 3 could be actuated independently instead of being integral with the mobile arms 5,6.

Figure 2:
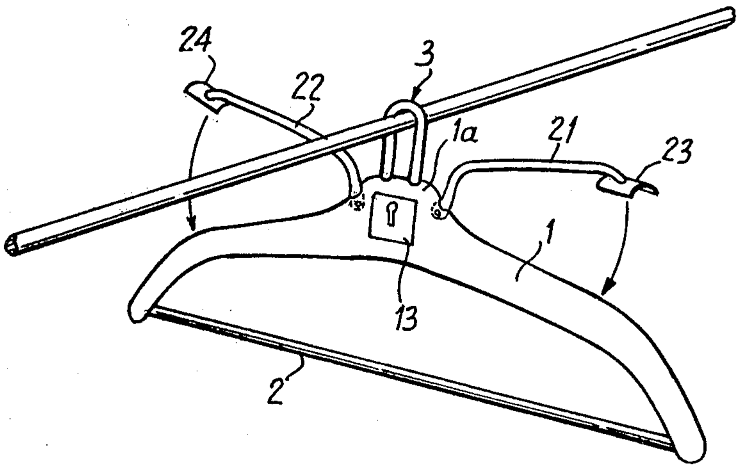
FIG. 2 is a schematic view in perspective of another embodiment.

In the variant embodiment illustrated in FIG. 2, the tamper-proof hanger according to the invention comprises two side arms 21, 22 which are pivoted on the top central part 1*a* of the top bow-shaped bar 1, about axes perpendicular to the hanger. In other words, the two arms 21, 22 may pivot while remaining in the plane of the hanger. They may occupy an open position in which they are relatively spaced apart from the top bar 1, as shown in FIG. 2, and a closed position in which pads 23, 24, with which their ends are provided, are applied on the top edge of the top bar 1. There again, the hanger is provided with a locking mechanism 13 which may be actuated by means of a key and which enables the arms 21, 22 to be pivoted towards their open position when it is desired to remove a garment from the hanger. As in the previous case, the mechanism 13 controls a movable member which ensures the closing or opening of the hook 3.

We claim:

1. A tamper-proof hanger comprising an inverted V-shaped yoke formed of a pair of converging arms with shoulder portions at each end thereof; an horizontal cross-member below said arms and interconnecting said arms; at least one downwardly tapering elongated member associated with one of said shoulder portions; said member being connected to a central part; a vertical member movably mounted in said yoke and having a lower end adapted to move in and out of contact with said cross member; said vertical member having an upper end associated with said central part; a hook extending upwardly from said central part; an upstanding rod extending from said yoke and passing through said central part; said rod having an upper end cooperating with said hook to surround support means for said hanger; lock means in said yoke for locking said elongated member in engagement with a garment against said shoulder portions, with said lower end of said vertical member in engagement with another garment against said cross member and with said upper end of said rod in at least close, locking proximity to said hook.

2. The hanger of claim 1, wherein pads formed of plastic foam are provided at the lower end of said elongated member and of said vertical member.

3. The hanger of claim 1, having a pair of said downwardly tapering members, each associated with one of said shoulder portions and connected by said central part.

4. The hanger of claim 1, wherein said lock means include a pawl pivoted in said yoke, a rack on said vertical member, spring means urging said pawl into engagement with said rack and key means for disengaging said pawl from said rack.

5. The hanger of claim 4, wherein said rack has teeth formed in a shape such as to be engaged automatically by vertically moving said vertical member relative to said pawl.

* * * * *